US010651768B2

(12) United States Patent
Lee et al.

(10) Patent No.: US 10,651,768 B2
(45) Date of Patent: *May 12, 2020

(54) MOTOR CONTROL DEVICE AND METHOD FOR CONTROLLING MOTOR CONTROL DEVICE

(71) Applicant: LG ELECTRONICS INC., Seoul (KR)

(72) Inventors: Yonghwa Lee, Seoul (KR); Donggeun Lee, Seoul (KR); Jeongeon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,468

(22) Filed: Jul. 26, 2019

(65) Prior Publication Data

US 2019/0348934 A1 Nov. 14, 2019

Related U.S. Application Data

(63) Continuation of application No. 15/855,012, filed on Dec. 27, 2017, now Pat. No. 10,411,623.

(30) Foreign Application Priority Data

Jan. 2, 2017 (KR) .................. 10-2017-0000412

(51) Int. Cl.
*H02M 7/5387* (2007.01)
*H02P 6/17* (2016.01)
*H02P 6/18* (2016.01)
*H02P 21/24* (2016.01)
*H02P 27/08* (2006.01)

(52) U.S. Cl.
CPC ................. *H02P 6/17* (2016.02); *H02P 6/18* (2013.01); *H02P 21/24* (2016.02); *H02P 27/08* (2013.01); *H02P 27/085* (2013.01)

(58) Field of Classification Search
CPC .. H02M 7/53875; H02M 7/53871; H02P 6/17
See application file for complete search history.

(56) References Cited

U.S. PATENT DOCUMENTS 5,811,949 A 9/1998 Garces
6,653,812 B1 * 11/2003 Huo .................. H02M 7/53875
318/801

(Continued)

FOREIGN PATENT DOCUMENTS

KR 10-2014-0049451 4/2014
WO WO 2011/024339 3/2011
WO WO 2013/038612 3/2013

OTHER PUBLICATIONS

Korean Office Action dated Nov. 28, 2017 issued in Application No. 10-2017-0000412.

(Continued)

*Primary Examiner* — Cortez M Cook
(74) *Attorney, Agent, or Firm* — Ked & Associates, LLP

(57) ABSTRACT

Provided are a motor control device and a method for controlling a motor control device. A switching frequency is varied with respect to a control sampling for controlling an inverter, whereby controlling is performed by securing a required control sampling according to a motor speed.

10 Claims, 6 Drawing Sheets

(56) References Cited

U.S. PATENT DOCUMENTS

2009/0284194 A1 11/2009 Forte
2013/0069572 A1 3/2013 Maekawa
2014/0103854 A1 4/2014 Bae et al.
2015/0311833 A1 10/2015 Bai et al.
2015/0349679 A1 12/2015 Rogers

OTHER PUBLICATIONS

European Search Report dated May 11, 2018 issued in Application No. 17210927.4.

* cited by examiner

MOTOR CONTROL DEVICE AND METHOD FOR CONTROLLING MOTOR CONTROL DEVICE

CROSS-REFERENCE TO RELATED APPLICATION

This application is a Continuation of U.S. application Ser. No. 15/855,012, filed Dec. 27, 2017, which claims priority under 35 U.S.C. § 119 to Korean Application No. 10-2017-0000412, filed on Jan. 2, 2017, whose entire disclosures are hereby incorporated by reference.

BACKGROUND

1. Field

The present disclosure relates to a motor control device and a control method of a motor control device, and more particularly, to a motor control device using a single current sensor, and a method for controlling a motor control device.

2. Background

A background art of the present disclosure relates to control of an inverter device controlling a motor.

In motor control technologies using the conventional inverter, in order to reduce a current sensor used for inverter control, research on estimation of a phase current by calculating current information of each phase through a single current sensor, rather than an AC current sensor of each phase, has been conducted. Meanwhile, as capacity of industrial inverters increases, a frequency of an output current has been increased for a motor output with a high revolution per minute (RPM).

Compared with an inverter having a general phase current sensor, an inverter using a single current sensor lacks control sampling for controlling a switching operation of the inverter, resulting in unstable control characteristics at a high speed operation. To solve this problem, it is necessary to increase a switching frequency. In the past, it is possible to control the single current sensor by applying a fixed switching frequency. In order to prevent shortage of control sampling according to motor speeds, a method of controlling an inverter by calculating control sampling required at a highest rate, fixing a PWM switching frequency to be high, and using the same has been proposed.

However, efficiency of this method may be maintained only in a high-speed region, resulting in a problem of system efficiency deterioration at a low-speed operation. In particular, in the case of a large-capacity inverter, a spectrum of an N-phase current using a single current sensor is wide and a motor is operated at a high speed in many cases, lengthening a time for fixing the switching frequency to be high. As a result, efficiency is significantly reduced due to shift from low-speed switching to high-speed switching, and since the switching frequency is fixed to be high, large switching loss is made.

That is, in the conventional inverter control using a single current sensor, control stability and the responsiveness deteriorate due to shortage of control sampling, and in order to solve this problem, the method of adjusting a switching frequency to a high-speed region or fixing the switching frequency to be high to control the inverter has been proposed but reduces efficiency in low speed control and increases switching loss.

BRIEF DESCRIPTION OF THE DRAWINGS

The embodiments will be described in detail with reference to the following drawings in which like reference numerals refer to like elements wherein.

DETAILED DESCRIPTION

Figure 1:
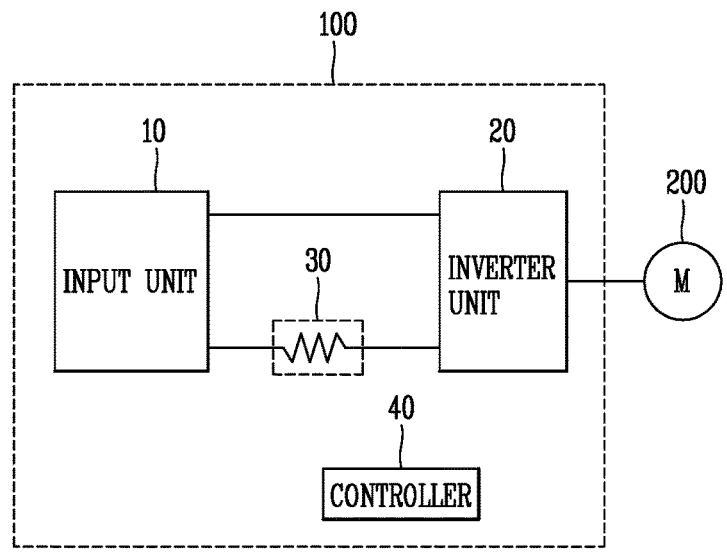
FIG. 1 is a block diagram illustrating a configuration of a motor control device disclosed in this disclosure.

The present disclosure disclosed in this disclosure may be applied to a motor control device and a control method of a motor control device. However, the present disclosure is not limited thereto and may also be applied to any existing motor control device using a single current sensor, a motor driving device, an inverter device controlling a motor, a control method of a motor control device, a control method of an inverter device, a controller for controlling a motor control device, a control method thereof, a control device controlling an inverter device, and a control method thereof, and may also advantageously be applied to a high speed inverter device using a single current sensor, and a control method thereof.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that may be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings.

An aspect of the detailed description is to provide a motor control device capable of controlling a motor by securing a necessary control sampling according to motor speeds, thus resolving the limitations of the related art in which control sampling is insufficient in the scheme of using a single current sensor, and a control method of the motor control device.

Another aspect of the detailed description is to provide a motor control device capable of appropriately varying a switching frequency according to motor speeds by controlling a motor by securing necessary control sampling according to motor speeds, and a control method of the motor control device.

Another aspect of the detailed description is to provide a motor control device capable of enhancing control stability and responsiveness of motor control, maintaining efficiency of control according to each speed region, and reducing switching loss by controlling a motor by securing a necessary control sampling according to motor speeds, and a control method of the motor control device.

In order to solve the above-mentioned problems, the motor control device and the method for controlling a motor control device disclosed in the present specification features that a switching frequency is varied on the basis of control sampling for controlling an inverter.

In detail, a rotation speed is measured such that necessary control sampling according to the rotation speed of the motor is secured, and the switching frequency is varied accordingly to secure control sampling.

Hereinafter, a motor control device and a control method of a motor control device disclosed in this disclosure will be described with reference to FIGS. 1 to 7.

FIG. 1 is a block diagram illustrating a configuration of a motor control device disclosed in this disclosure.

Figure 2:
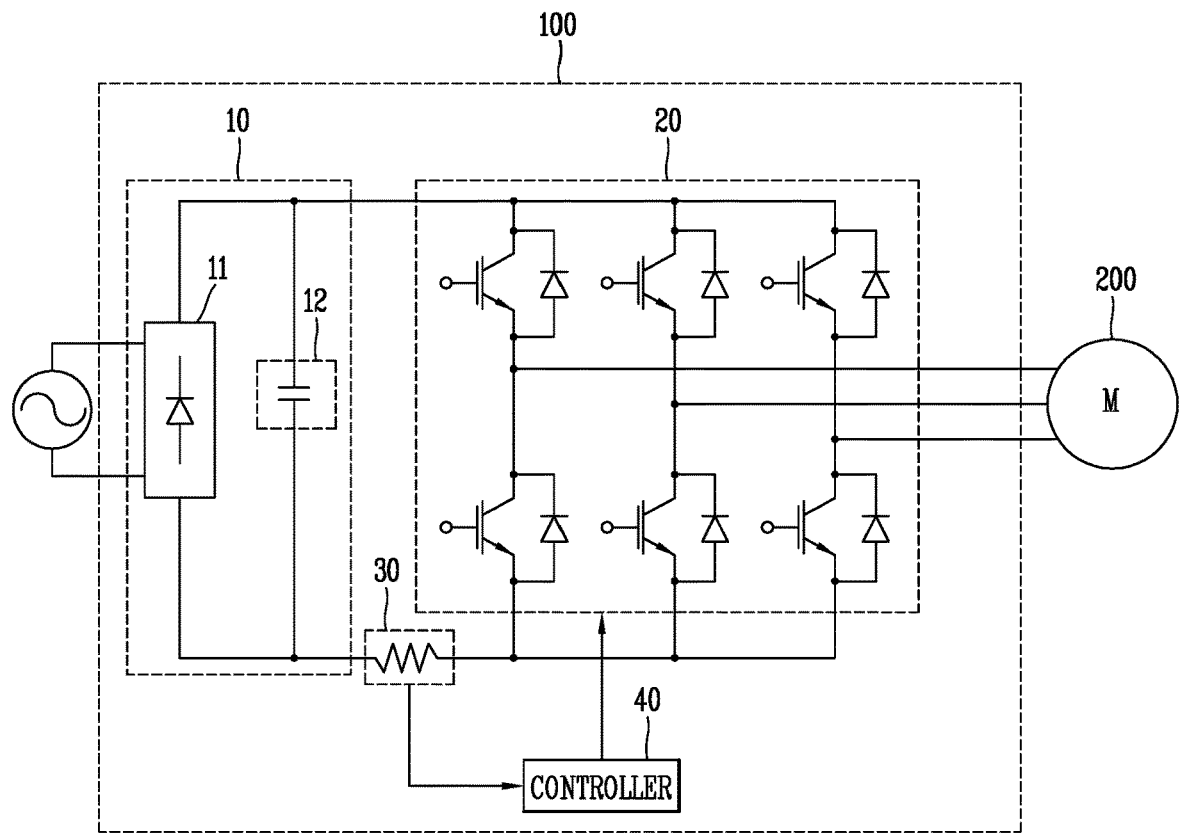
FIG. 2 is a view illustrating a configuration of an embodiment of a motor control device disclosed in this disclosure.

FIG. 2 is a view illustrating a configuration of an embodiment of a motor control device disclosed in this disclosure.

Figure 3:
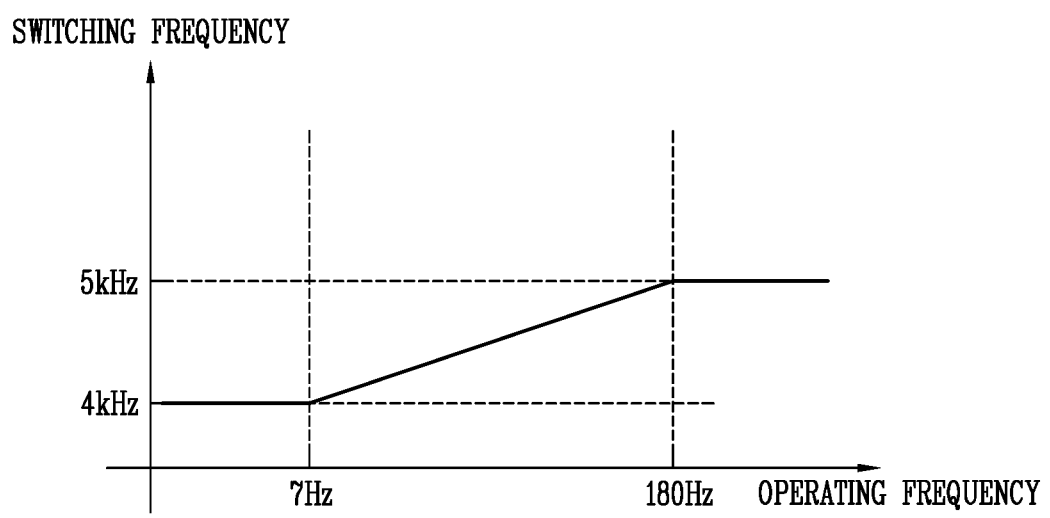
FIG. 3 is a view illustrating an example in which a switching frequency is varied according to an embodiment of a motor control device disclosed in this disclosure.

FIG. 3 is a view illustrating an example in which a switching frequency is varied according to an embodiment of a motor control device disclosed in this disclosure.

Figure 4:
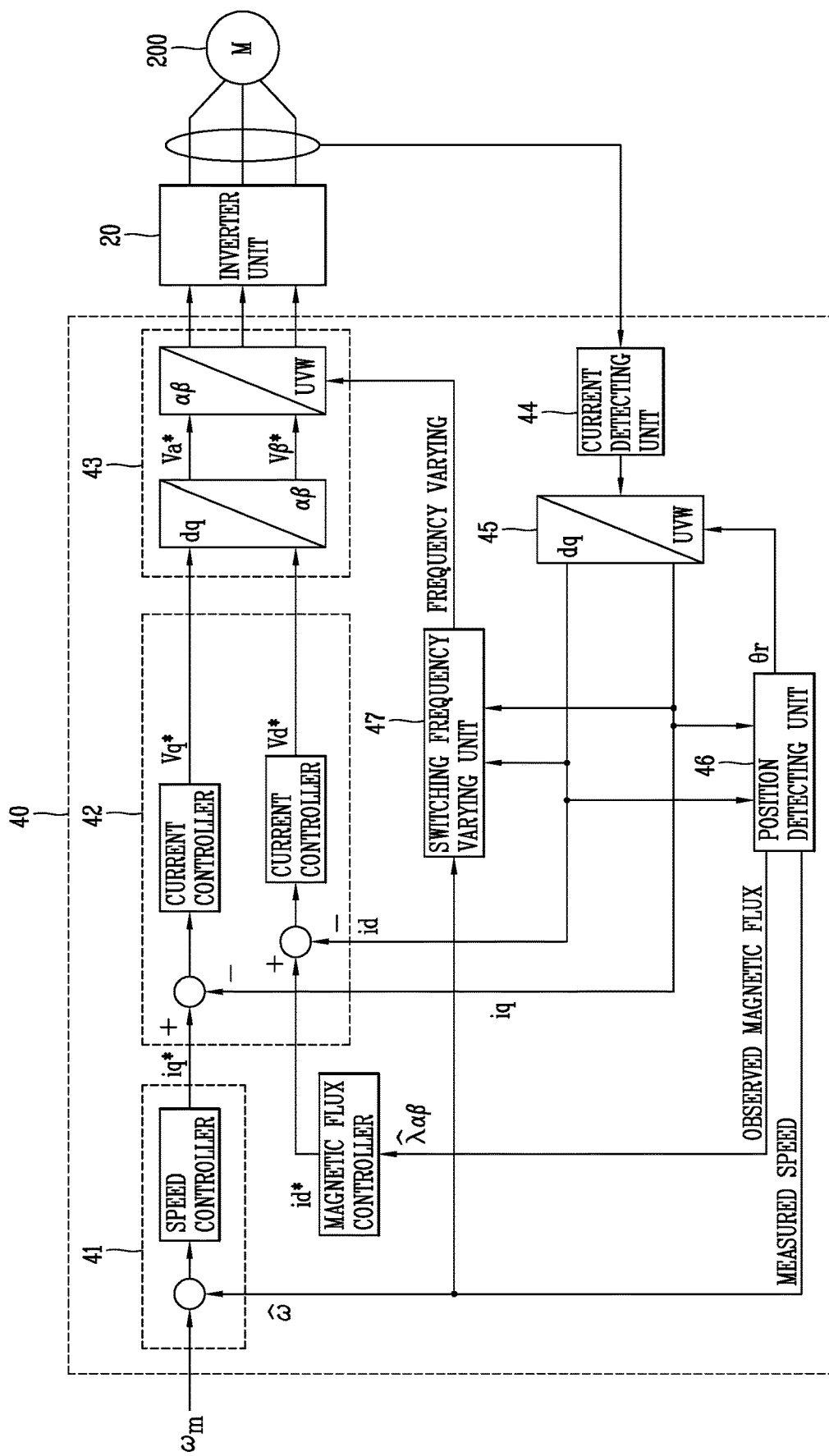
FIG. 4 is a view illustrating a configuration of a controller according to an embodiment of a motor control device disclosed in this disclosure.

FIG. 4 is a view illustrating a configuration of a controller according to an embodiment of a motor control device disclosed in this disclosure.

Figure 5:
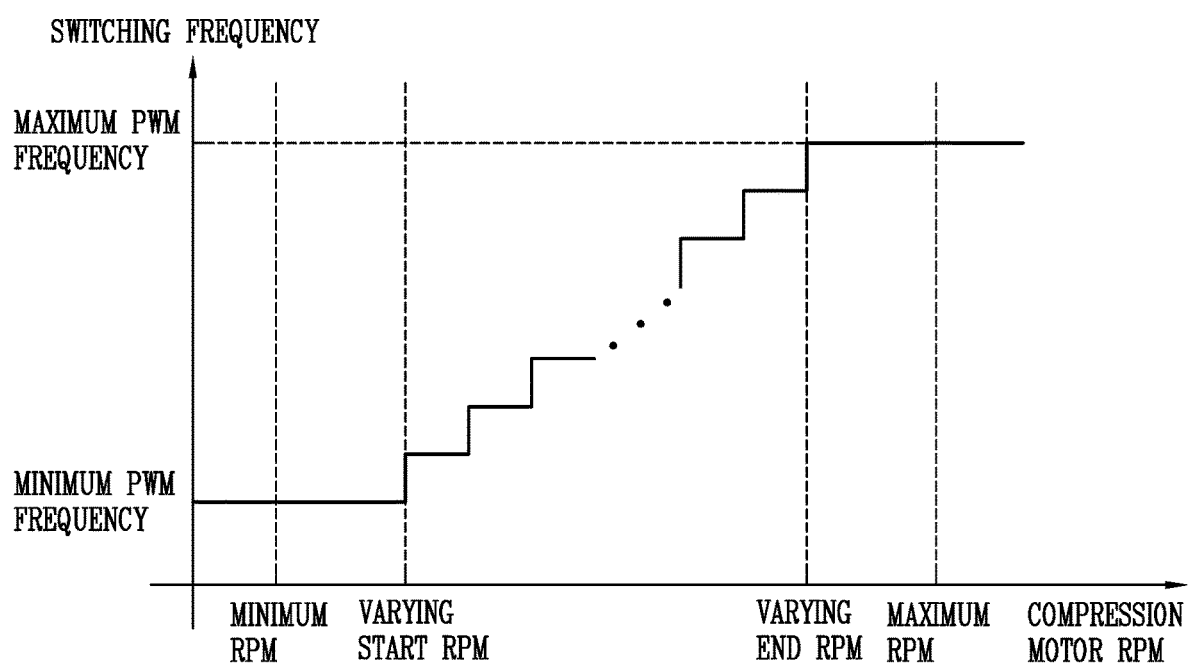
FIG. 5 is a view illustrating an example of speed sections and stepwise varying of a switching frequency according to an embodiment of a motor control device disclosed in this disclosure.

FIG. 5 is a view illustrating an example of speed sections and stepwise varying of a switching frequency according to an embodiment of a motor control device disclosed in this disclosure.

Figure 6:
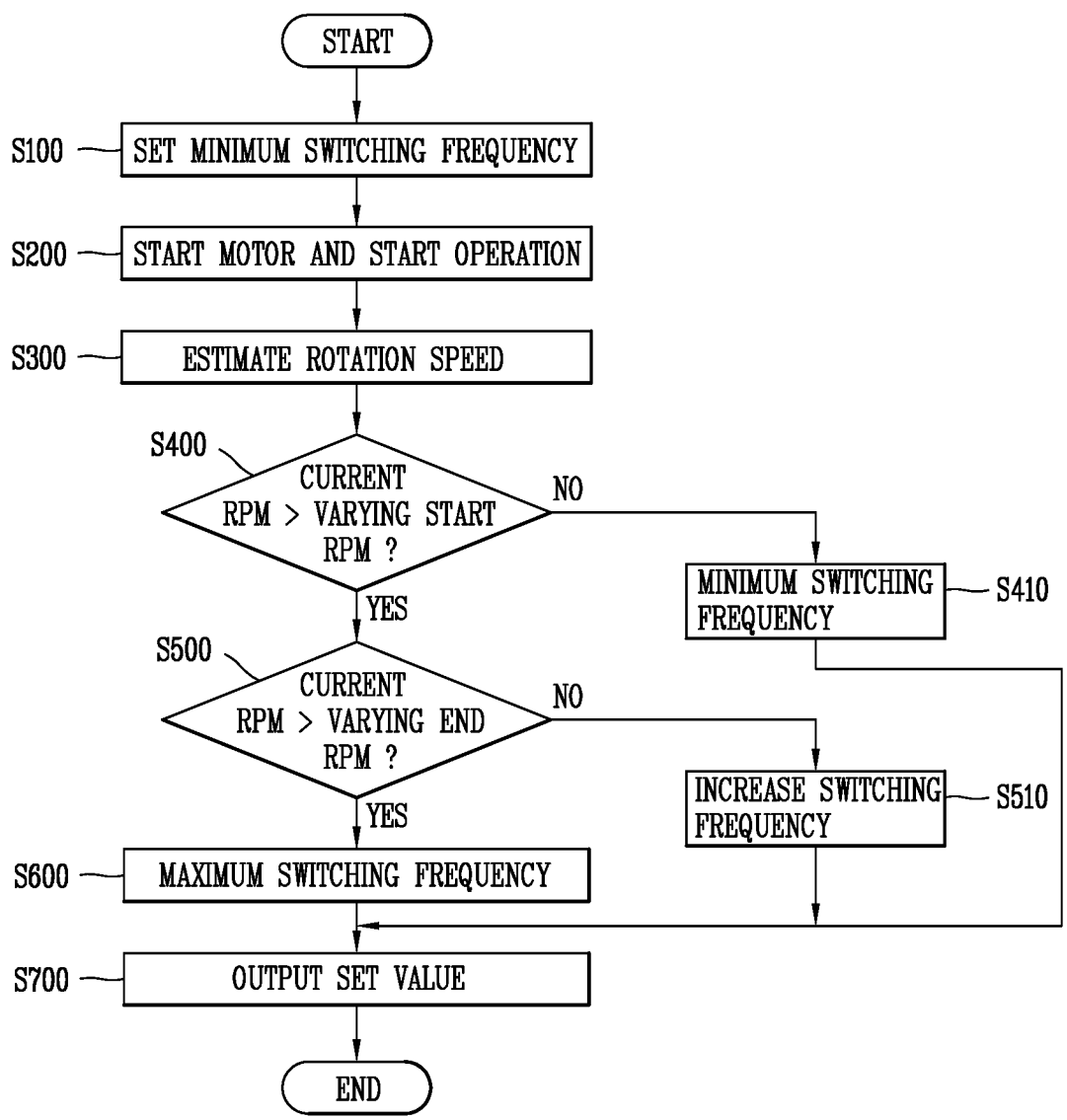
FIG. 6 is a flow chart illustrating a control process according to an embodiment of a motor control device disclosed in this disclosure.

FIG. 6 is a flow chart illustrating a control process according to an embodiment of a motor control device disclosed in this disclosure.

Figure 7:
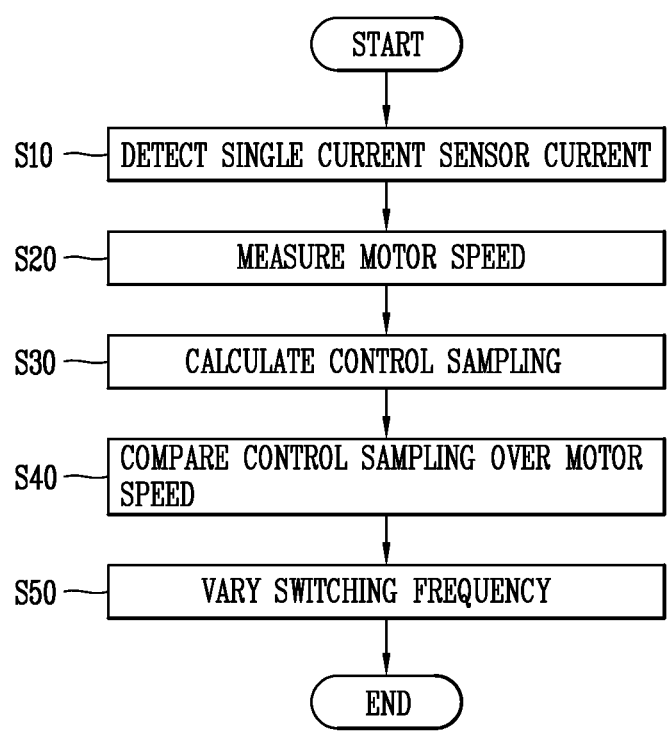
FIG. 7 is a flow chart illustrating a control method of a motor control device disclosed in this disclosure.

FIG. 7 is a flow chart illustrating a control method of a motor control device disclosed in this disclosure.

The motor control device (hereinafter, referred to as a "control device") disclosed in this disclosure refers to a control device controlling driving of a motor.

The control device may be a control device using a single current sensor scheme.

The control device may be a device for controlling a motor in an inverter manner.

The control device may control driving of the motor by controlling power applied to the motor through an inverter.

The control device may control a revolution per minute (RPM) of the motor by controlling power applied to the motor by controlling a switching operation of the inverter.

As illustrated in FIG. 1, a control device 100 includes an input unit 10 for receiving power from the outside, an inverter unit 20 (e.g., inverter) for converting the input power into AC power and applying the same to a motor 200, a single current sensor 30 for detecting a current as a basis for measuring a rotation speed of the motor 200, and a controller 40 measuring a rotation speed of the motor 200 on the basis of the detected current and controlling a switching operation of the inverter unit 20 according to the rotation speed. The controller 40 varies a switching operation of the inverter unit 20 on the basis of control sampling for controlling the inverter unit 20.

FIG. 2 illustrates a specific configuration of the control device 100.

The input unit 10 may receive AC power from the outside.

The input unit 10 may include a rectifying unit 11 (e.g., rectifier) for rectifying the AC power received from the outside to DC power and a smoothing unit 12 for smoothing the rectified DC power from the rectifying unit 11.

The input unit 10 may be connected to the inverter unit 20 and transmit smoothed DC power to the inverter unit 20.

The inverter unit 20 may be connected to the motor 200, convert the DC power input through the input unit 10 into AC power and apply the converted AC power to the motor 200.

The inverter unit 20 may convert the DC power into AC power through a switching operation and apply the converted AC power to the motor 200.

The inverter unit 20 may include a plurality of switching modules for converting the DC power into three-phase AC power.

The plurality of switching modules may preferably be an insulated gate bipolar transistor (IGBT) module.

A switching operation of the plurality of switching modules may be controlled by the controller 40.

That is, the inverter unit 20 may be controlled by the controller 40.

The plurality of switching modules may receive a control signal for the switching operation from the controller 40, and may perform a switching operation according to the control signal to convert the direct current power into the AC power.

The inverter unit 20 may be controlled in switching operation by the controller 40 to control driving of the motor 200.

The inverter unit 20 may control a rotation speed of the motor 200 by controlling power applied to the motor 200 through the control of the switching operation.

Here, the rotation speed may refer to a speed at which the motor 200 rotates.

The rotation speed may also be replaced by an operating frequency at which the motor 200 is operated, which is associated with the rotation speed, or an RPM of the motor 200.

Hereinafter, for convenience of explanation, the embodiment will be described on the basis of the rotation speed, but the present disclosure may also be implemented by replacing the rotation speed with the operating frequency or the RPM.

The single current sensor 30 may be a resistor element in which the direct current is conducted to be detected, or may be a DC sensor including the resistor element.

The single current sensor 30 may be a DC current sensor provided between the input unit 10 and the inverter unit 20.

The single current sensor 30 may be provided between a lower end of the input unit 10 and a lower end of the inverter unit 20.

A current according to a switching operation of the inverter unit 20 may be conducted and detected in the single current sensor 30.

The current conducted in the single current sensor 30 may be detected by the controller 40.

The controller 40 may detect a current using the single current sensor 30 and control a switching operation of the inverter unit 20.

The controller 40 may measure a rotation speed of the motor 200 on the basis of the current detected by the single current sensor 30 and control the switching operation of the inverter unit 20 according to the rotation speed.

The controller 40 may detect a current flowing in the single current sensor 30 according to a switching operation of the inverter unit 20 to measure a 3-phase current applied to the motor 200 on the basis of the detected current, and measure the rotation speed on the basis of the measured 3-phase current.

That is, the controller 40 may measure the 3-phase current applied to the motor 200 using the single current sensor 30, and measures the rotation speed on the basis of the measured 3-phase current.

The controller 40 may control a switching frequency of the inverter unit 20 according to the rotation speed.

For example, as shown in FIG. 3, while the rotation speed (operating frequency) is increased from 7 [Hz] to 180 [Hz], the switching frequency may be controlled to be increased from 4 [KHz] to 5 [KHz] according to the rotation speed.

The controller 40 may generate a control signal for controlling the switching frequency of the inverter unit 20 according to the rotation speed and apply the control signal to the inverter unit 20 to control a switching operation of the inverter unit 20.

A configuration of the controller 40 for controlling the switching operation of the inverter unit 20 may be the same as that illustrated in FIG. 4.

As illustrated in FIG. 4, the controller 40 may include a speed controller 41 generating a current command ($i_q^*$) according to a command speed ($\omega_m$), a current controller 42 generating voltage commands ($V_d^*$ and $V_q^*$) according to the current command ($i_q^*$), a signal generating unit 43 performing α-β/U-V-W conversion on the voltage commands ($V_d^*$ and $V_q^*$) and generating a PWM control signal for controlling a switching operation of the inverter unit, a current detecting unit 44 for detecting and measuring a current applied to the motor 200 from the inverter unit 20 using the single current sensor 30, a conversion unit 45 performing U-V-W/d-q conversion on the measured current and feeding the same back to the current controller 42, a position detecting unit 46 (sensorless controller) detecting a position of the motor 200 on the basis of the result of conversion, transferring a measurement speed to the speed controller 41, transferring an observed magnetic flux to a magnetic flux controller, and transferring a position detection result ($\theta_r$) to the conversion unit 45, and a switching frequency varying unit 47 generating a switching frequency command regarding a switching operation of the inverter unit 20 on the basis of the conversion result and the measurement speed and transferring the generated switching frequency command to the signal generating unit 43.

The controller 40 may include the aforementioned components to generate the control signal according to the rotation speed, and apply the control signal to the inverter unit 20 to control a switching operation of the inverter unit 20.

The controller 40 controls a switching operation of the inverter unit 20 according to the rotation speed and varies a switching frequency of the inverter unit 20 on the basis of a control sampling for controlling the inverter unit 20.

Here, the control sampling may mean a sampling frequency for controlling the inverter unit 20.

The control sampling may also denote the number of sampling frequencies, a time of the sampling frequency, and so on.

The control sampling may be increased or decreased depending on the switching frequency.

That is, when the switching frequency increases, the control sampling may increase, and when the switching frequency decreases, the control sampling may decrease.

The controller 40 may calculate minimum control sampling required for control according to the rotation speed, compare a current control sampling with the minimum control sampling, and may vary the switching frequency according to the comparison result.

Here, the minimum control sampling may mean a minimum value of control sampling for controlling the switching operation of the inverter unit 20 according to the rotation speed.

The minimum control sampling may be calculated according to a preset reference.

The preset reference may be a reference in which a formula for calculating the minimum control sampling based on the switching frequency with respect to the rotation speed or a control sampling according to the switching frequency compared with the rotation speed are stored as a table.

If the current control sampling is less than or equal to the minimum control sampling, the controller 40 may determine a switching frequency corresponding to the minimum control sampling and vary the switching frequency to the determined switching frequency.

That is, when the current control sampling is less than or equal to the minimum control sampling, the controller 40 may determine that the control sampling required for the control according to the rotation speed is insufficient, and increase the current control sampling by varying the switching frequency.

When the current control sampling is less than or equal to the minimum control sampling, the controller 40 determines a switching frequency corresponding to the minimum control sampling and varies the switching frequency to the determined switching frequency, so that the inverter unit 20 may be controlled to be operated at the varied switching frequency.

In this case, the switching frequency may be a minimum switching frequency of the inverter unit 20 for controlling the motor 200 according to the rotation speed.

The controller 40 may calculate a maximum control sampling required for the control according to the rotation speed, compare the current control sampling with the minimum control sampling, and may vary the switching frequency according to the comparison result.

Here, the maximum control sampling may mean a maximum value of control sampling for controlling the switching operation of the inverter unit 20 according to the rotation speed.

The maximum control sampling may be calculated according to a preset reference.

The preset reference may be a reference in which a formula for calculating the maximum control sampling based on the switching frequency with respect to the rotation speed or a control sampling according to the switching frequency compared with the rotation speed are stored as a table.

If the current control sampling is less than or equal to the maximum control sampling, the controller 40 may determine the switching frequency corresponding to the maximum control sampling and vary the switching frequency to the determined switching frequency.

That is, when the current control sampling is less than or equal to the maximum control sampling, the controller 40 determines that control sampling required for control according to the rotation speed may be additionally secured, the sampling may be increased.

If the current control sampling is less than or equal to the maximum control sampling, the controller 40 may determine a switching frequency corresponding to the maximum control sampling and may vary the switching frequency to the determined switching frequency.

That is, when the current control sampling is less than or equal to the maximum control sampling, the controller 40 may determine that the control sampling required for the control may be additionally secured, and increase the current control sampling by varying the switching frequency.

When the current control sampling is less than or equal to the minimum control sampling, the controller 40 determines a switching frequency corresponding to the minimum control sampling and varies the switching frequency to the determined switching frequency, so that the inverter unit 20 may be controlled to be operated at the varied switching frequency.

In this case, the switching frequency may be a maximum switching frequency of the inverter unit 20 for controlling the motor 200 according to the rotation speed.

The controller 40 may calculate a minimum and maximum control sampling required for the control according to the rotation speed, compare the current control sampling with the minimum and maximum control sampling, and may vary the switching frequency according to the comparison result.

When the current control sampling does not correspond to an area between the minimum and maximum control sampling, the controller 40 may determine a switching frequency corresponding to any one sampling between the minimum and maximum control sampling and vary the switching frequency to the determined switching frequency.

The controller 40 controls the switching operation of the inverter unit according to the rotation speed, and when the rotation speed corresponds to a preset speed section, the controller may vary the switching frequency.

That is, the controller 40 may measure the rotation speed and, when the rotation speed corresponds to the preset speed section, the controller 40 may vary the switching frequency of the inverter unit 20 based on the control sampling.

The preset speed section may be a speed section corresponding to a section requiring an increase of the control sampling.

The preset speed section may be a speed section corresponding to a section in which the increase of the control sampling for controlling the inverter unit 20 is required as the rotation speed increases.

That is, the predetermined speed section may be a section for varying the switching frequency as the control sampling for controlling the inverter unit 20 is required to be increased.

As illustrated in FIG. 5, the controller 40 may control the inverter unit 20 to operate at a minimum switching frequency up to a start point of the preset speed section, and control the inverter unit 20 to operate at a maximum switching frequency from an end point of the preset speed section.

For example, when the rotation speed corresponds to a point before the start point of the predetermined speed section, the controller 40 controls the inverter unit 20 at the minimum switching frequency, and when the rotation speed corresponds to the start point of the preset speed section or the end point of the preset speed section, the controller 40 may vary the switching frequency of the inverter unit 20 from the minimum switching frequency to the maximum switching frequency according to the rotation speed, and when the rotation speed corresponds to a point after the end point of the reset speed section, the controller 40 may control the inverter unit 20 at the maximum switching frequency.

That is, from the viewpoint of controlling the rotation speed, the rotation speed is controlled at the minimum switching frequency until the preset speed section, the rotation speed is controlled by varying the switching frequency in the preset speed section, and the rotation speed may be controlled at the maximum switching frequency after the preset speed section.

The controller 40 may vary the switching frequency stepwise according to the rotation speed during the predetermined speed section.

The controller 40 may vary the switching frequency stepwise according to a preset variable reference during the predetermined speed section.

The preset variable reference may be a reference for varying the switching frequency stepwise according to the rotation speed.

In other words, the preset variable reference may be a reference set to increase a predetermined frequency per constant speed.

For example, the preset variable reference may be set to increase the switching frequency by 0.1 [KHz] each time the rotation speed increases by 10 [rpm].

The motor control process of the control device 100 as described above will be summarized below with reference to FIGS. 5 and 6.

First, in order to start the motor 200, the control device 100 initially sets the switching frequency of the inverter unit 30 to the minimum switching frequency at step S100 and drive the motor 200 (3200). Thereafter, in the course of controlling the operation of the motor 200, the control device 100 estimates a rotation speed using the single current sensor 30 (S300). In this case, the rotation speed estimated using the single current sensor 30 may be replaced with the RPM of the motor 200 or the operating frequency of the motor 200.

After the rotation speed is estimated (S300), it is determined whether a current rotation speed (RPM) exceeds a speed corresponding to the variable frequency start of varying of the switching frequency in the preset speed section (S400). When the current rotation speed (RPM) exceeds the speed corresponding to the start of varying, that is, when the rotation speed (RPM) enters the preset speed section, the control device 100 determines whether the current rotation speed (RPM) exceeds a speed corresponding to end of varying of the switching frequency of the preset speed section (S500). When the current rotation speed (RPM) is less than the speed corresponding to the start of varying, that is, when the rotation speed (RPM) does not enter the preset speed section, the control device 100 fixes the switching frequency to the minimum switching frequency (S410).

After it is determined whether the current rotation speed (RPM) exceeds the speed corresponding to the start of varying (S400), it may be determined whether the current rotation speed (RPM) exceeds the speed corresponding to the end of varying of the switching frequency of the preset speed section (S500). When the current rotation speed (RPM) exceeds the speed corresponding to the end of varying, that is, when the rotation speed (RPM) exceeds the preset speed section, the switching frequency is fixed to the maximum switching frequency (S600), and when the current rotation speed (RPM) is less than the speed corresponding to the end of varying, that is, when the rotation speed (RPM) is within the preset speed section, the switching frequency is increased (S510). In this case, as illustrated in FIG. 5, the switching frequency is varied stepwise according to the rotation speed. That is, while the rotation speed is increased, when the rotation speed corresponds to within the preset speed section, the switching frequency is varied stepwise according to the rotation speed (S510).

In this manner, the controller 40 measures the rotation speed of the motor 200 using the single current sensor 30, fixes or determines whether the switching frequency is to be varied according to the rotation speed, generates a control signal for a set value of the fixed or varied switching frequency so that the inverter unit 30 performs a switching operation according to the determination result, and outputs the control signal to the inverter unit 30 (S700), whereby the switching frequency is varied according to the rotation speed of the inverter unit 30.

Hereinafter, a control method of the motor control device (hereinafter referred to as the control method) disclosed in this specification will be described, but a portion overlapping with the concept described above in the motor control device will be omitted as much as possible and an embodiment of the control method will be mainly described.

The control method may be a method of controlling a control device for controlling the motor.

That is, the control method may be a control method for controlling the motor.

The control method may be a control method of a control means included in the motor control device and controlling the motor control device.

The control method may be a control method for controlling the control device 100 described above.

The control method may be a control method of the controller 40 included in the control apparatus 100 described above.

The control method may be a control method for controlling a motor control device using a single current sensor.

As shown in FIG. 7, the control method includes detecting a current flowing in a single current sensor included in the motor control device (S10), measuring the rotation speed of the motor based on the detected current (S20), calculating a reference control sampling corresponding to the rotation speed (S30), comparing the current control sampling with the reference control sampling (S40), and varying a switching frequency of an inverter included in the motor control device according to a comparison result (S50).

Here, the control device is a motor control device that controls driving and rotation of the motor by applying power to the motor, and may be a device including the single current sensor and the inverter and supplying power to the motor through a switching operation of the inverter.

The control device may be the control device described above.

The control method may be an inverter control method measuring the rotation speed through the single current sensor included in the control device, and controlling a switching operation of the inverter based on the rotation speed to control power applied to the motor.

The single current sensor may be energized with a current according to the switching operation of the inverter.

In step S10 of detecting a current flowing in the single current sensor, a current flowing in the single current sensor according to the switching operation of the inverter may be detected.

In step S20 of measuring the rotation speed of the motor, a current flowing in the single current sensor according to the switching operation of the inverter may be detected, a 3-phase current applied to the motor is measured on the basis of the detected current, and the rotation speed may be measured based on the measured 3-phase current.

In step S30 of calculating the reference control sampling, the reference control sampling to be compared with the current control sampling may be calculated.

The control sampling may refer to a sampling frequency for controlling the inverter.

The control sampling may also denote the number of the sampling frequencies and a time of the sampling frequency.

The reference control sampling may be a minimum or maximum control sampling required for control according to the rotation speed.

The minimum control sampling may refer to a minimum value of the control sampling for controlling the switching operation of the inverter according to the rotation speed.

The maximum control sampling may refer to a maximum value of the control sampling for controlling the switching operation of the inverter according to the rotation speed.

In step S30 of calculating the reference control sampling, the minimum control sampling or the maximum control sampling may be calculated on the basis of the rotation speed.

The reference control sampling may be calculated according to a preset reference based on the rotation speed.

The preset reference may be a formula for calculating the reference control sampling on the basis of the switching frequency with respect to the rotation speed or a table based on the control sampling based on the switching frequency with respect to the rotation speed.

The preset reference may be a reference in which a formula for calculating the reference control sampling based on the switching frequency with respect to the rotation speed or a control sampling according to the switching frequency compared with the rotation speed are stored as a table.

In step S40 of comparing the current control sampling with the reference control sampling, the current control sampling may be compared with the minimum or maximum control sampling to vary the switching frequency.

In step S50 of varying the switching frequency, if the current control sampling is less than or equal to the minimum sampling, a switching frequency corresponding to the minimum control sampling may be determined and the switching frequency may be varied to the determined switching frequency.

That is, if the current control sampling is less than or equal to the minimum control sampling, it may be determined that the control sampling required for the control according to the rotation speed is insufficient, and the current control sampling is increased by varying the switching frequency.

In step S50 of varying the switching frequency, when the current control sampling is less than or equal to the minimum control sampling, a switching frequency corresponding to the minimum control sampling may be determined and the switching frequency may be varied to the determined switching frequency, whereby the inverter may be controlled to operate at the varied switching frequency.

In step S50 of varying the switching frequency, when the current control sampling is less than or equal to the maximum control sampling, a switching frequency corresponding to the maximum control sampling may be determined and the switching frequency may be varied to the determined switching frequency.

That is, if the current control sampling is less than or equal to the maximum control sampling, it is determined that control sampling required for control according to the rotation speed may be additionally secured, and the current control sampling may be increased by varying the switching frequency.

In step S50 of varying the switching frequency, when the current control sampling is less than or equal to the maximum control sampling, a switching frequency corresponding to the maximum control sampling may be determined, and the switching frequency may be varied to the determined switching frequency, such that the inverter may be controlled to be operated at the varied switching frequency.

The control method as described above may be performed in real time during a process of controlling the motor.

The control method may be performed in real time during a process of rotating the motor at a speed of a predetermined region.

According to the control method, the switching frequency may be varied when the rotation speed corresponds to a preset speed section.

That is, the rotation speed may be measured, and when the rotation speed corresponds to the preset speed section, the switching frequency of the inverter may be varied based on the control sampling.

The predetermined speed section may be a speed section corresponding to a section requiring an increase in the control sampling for controlling the inverter as the rotation speed increases.

That is, the preset speed section may be a section in which it is required to increase the control sampling for control of the inverter and a section for varying the switching frequency is preset.

The preset speed section may be set as a section from a speed of a time point at which the control sampling is required to be increased to a speed of a time point at which the control sampling may be maximally increased.

In step S50 of varying the switching frequency, the inverter may be controlled to operate at the minimum switching frequency until the start point of the preset speed section and operate at the maximum switching frequency from an end point of the preset speed section.

That is, from the viewpoint of controlling the rotation speed, the rotation speed may be controlled at the minimum switching frequency until the preset speed section, the rotation speed may be controlled by varying the switching frequency in the preset speed section, and the rotation speed may be controlled at the maximum switching frequency after the preset speed section.

In step S50 of varying the switching frequency, the switching frequency may be varied stepwise according to the rotation speed.

In step S50 of varying the switching frequency, the switching frequency may be varied stepwise according to the rotation speed during the preset speed section.

In step S50 of varying the switching frequency, the switching frequency may be varied stepwise according to a preset varying reference during the preset speed section.

The preset varying reference may be a reference for varying the switching frequency stepwise according to the rotation speed.

For example, the preset varying reference may be a reference set to increase a predetermined frequency per constant speed.

Therefore, an aspect of the detailed description is to provide a motor control device capable of controlling a motor by securing a necessary control sampling according to motor speeds, thus resolving the limitations of the related art in which control sampling is insufficient in the scheme of using a single current sensor, and a control method of the motor control device.

Another aspect of the detailed description is to provide a motor control device capable of appropriately varying a switching frequency according to motor speeds by controlling a motor by securing necessary control sampling according to motor speeds, and a control method of the motor control device.

Another aspect of the detailed description is to provide a motor control device capable of enhancing control stability and responsiveness of motor control, maintaining efficiency of control according to each speed region, and reducing switching loss by controlling a motor by securing a necessary control sampling according to motor speeds, and a control method of the motor control device.

In order to solve the above-mentioned problems, the motor control device and the method for controlling a motor control device disclosed in the present specification features that a switching frequency is varied on the basis of control sampling for controlling an inverter.

In detail, a rotation speed is measured such that necessary control sampling according to the rotation speed of the motor is secured, and the switching frequency is varied accordingly to secure control sampling.

To achieve these and other advantages and in accordance with the purpose of this specification, as embodied and broadly described herein, a motor control device includes: an input unit receiving power from the outside; an inverter unit converting the input power into AC power and applying the converted AC power to a motor; a single current sensor detecting a current used as a basis for measuring a rotation speed of the motor; and a controller measuring a rotation speed of the motor on the basis of the detected current and controlling a switching operation of the inverter unit according to the rotation speed, wherein the controller varies the switching frequency of the inverter unit on the basis of control sampling for controlling the inverter unit.

The inverter unit may include a plurality of switching modules converting the DC power into 3-phase AC power.

The single current sensor may be a DC current sensor provided between the input unit and the inverter unit.

The controller may detect a current flowing in the single current sensor according to a switching operation of the inverter unit, measure a 3-phase current applied to the motor on the basis of the detected current, and measure the rotation speed on the basis of the measured 3-phase current.

The controller may calculate a minimum control sampling required for control according to the rotation speed, compare a current control sampling with the minimum control sample, and vary the switching frequency according to a comparison result.

When the current control sampling is less than or equal to the minimum control sampling, the controller may determine a switching frequency corresponding to the minimum control sampling and vary the switching frequency to the determined switching frequency.

The controller may calculate a maximum control sampling required for control according to the rotation speed, compare a current control sampling with the maximum control sampling, and vary the switching frequency according to a comparison result.

When the current control sampling is less than or equal to the maximum control sampling, the controller may determine a switching frequency corresponding to the maximum control sampling and vary the switching frequency to the determined switching frequency.

The controller may calculate maximum and minimum control sampling required for control according to the rotation speed, compare the current control sampling with the minimum and maximum control samplings, and vary the switching frequency according to a comparison result.

When the current control sampling does not correspond to an area between the minimum and maximum control sampling, the controller may determine a switching frequency corresponding to any one sampling between the minimum and maximum control samplings, and vary the switching frequency to the determined switching frequency.

When the rotation speed corresponds to a preset speed section, the controller may vary the switching frequency.

The preset speed section may be a speed section corresponding to a section requiring an increase in the control sampling.

During the preset speed section, the controller may vary the switching frequency stepwise according to the rotation speed.

To achieve these and other advantages and in accordance with the purpose of this specification, as embodied and broadly described herein, a method for controlling a motor control device using a single current sensor, includes: detecting a current flowing in the single current sensor; measuring a rotation speed of a motor on the basis of the detected current; calculating a reference control sampling corresponding to the rotation speed; comparing a current control sampling with the reference control sampling; and varying a switching frequency of an inverter included in the motor control device according to a comparison result.

The reference control sampling may be a minimum or maximum sampling reference required for control according to the rotation speed.

In the varying of the switching frequency, when the current control sampling is less than or equal to the minimum control sampling, a switching frequency corresponding to the minimum control sampling may be determined and the switching frequency may be varied to the determined switching frequency.

In the varying of the switching frequency, when the current control sampling is less than or equal to the maximum control sampling, a switching frequency corresponding to the maximum control sampling may be determined and the switching frequency may be varied to the determined switching frequency.

In the varying of the switching frequency, when the current control sampling does not correspond to an area between the minimum and maximum control sampling, a switching frequency corresponding to any one sampling between the minimum and maximum control samplings may be determined and the switching frequency may be varied to the determined switching frequency.

When the rotation speed corresponds to a preset speed section, the switching frequency may be varied, and the preset speed section may be a speed section corresponding to a section requiring an increase in the control sampling.

In the varying of the switching frequency, the switching frequency may be varied stepwise according to the rotation speed.

According to the motor control method and the method for controlling a motor control device disclosed in the present specification, since a switching frequency is varied with respect to control sampling for controlling the inverter, control securing control sampling required for control may be performed.

More specifically, the motor control device and the method for controlling the motor control device disclosed in this specification, since control securing required control sampling is performed, responsiveness and stability of control of a switching operation according to a rotation speed of the motor may be enhanced.

Due to the effect, the motor control device and the method for controlling the motor control device disclosed in this specification may solve the limitations of the related art in which control according to a rotation speed of the motor is not effectively performed due to shortage of control sample using a single current sensor.

Thus, in the motor control device and the method for controlling the motor control device disclosed in this specification, switching may be appropriately performed at low speed and high speed regions and the motor and the switching module included in the motor control device may be stably driven, increasing switching efficiency/performance of motor control.

In addition, the motor control device and the method for controlling the motor control device disclosed in this specification enhance efficiency and usability of the control scheme of using the single current sensor, increasing utilization of the control scheme of using the single current sensor.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the scope of the disclosure will become apparent to those skilled in the art from the detailed description.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A motor control device comprising:
    an input unit that receives external power;
    an inverter that converts power from the input unit into AC power and provides the converted AC power to a motor;
    a single current sensor that detects a current at the inverter as a basis for measuring a rotation speed of the motor; and
    a controller that measures the rotation speed of the motor based on the detected current and controls a switching operation of the inverter according to the rotation speed,
    wherein the controller varies a switching frequency of the inverter based on a control sampling for controlling the inverter,
    wherein the controller calculates a maximum control sampling according to the rotation speed, compares a current control sampling with the maximum control sampling, and adjusts the switching frequency according to a comparison result, and
    wherein when the current control sampling is less than or equal to the maximum control sampling, the controller determines a switching frequency corresponding to the maximum control sampling and adjusts the switching frequency to the determined switching frequency.

2. The motor control device of claim 1, wherein the single current sensor is a DC current sensor provided between the input unit and the inverter.

3. The motor control device of claim 1, wherein
    when the rotation speed corresponds to a preset range in speed, the controller adjusts the switching frequency.

4. The motor control device of claim 3, wherein
    the preset range in speed is a range in the rotation speed of the motor in which the control sampling is adjusted.

5. The motor control device of claim 4, wherein
    when the rotation speed of the motor is within the preset range in speed, the controller adjusts the switching frequency stepwise according to the rotation speed.

6. The motor control device of claim 5, wherein the controller adjusts the switching frequency stepwise such that the switching frequency is adjusted by a prescribed amount each time the rotation speed changes by a prescribed amount.

7. The motor control device of claim 6, wherein the prescribed amount of change in the rotation speed is 10 rpm and the prescribed amount of stepwise adjustment in the switching frequency is 0.1 KHz such that the switching frequency is increased in increments of 0.1 KHz for each 10 rpm increase in rotation speed while the rotation speed is within the preset range in speed.

8. A method for controlling a motor control device having a single current sensor, the method comprising:
    detecting, by the single current sensor, a current for a motor;
    determining, by a controller, a rotation speed of the motor based on the detected current from the single current sensor;
    calculating, by the controller, a reference control sampling corresponding to the rotation speed;
    comparing a current control sampling with the reference control sampling; and
    adjusting a switching frequency of an inverter included in the motor control device according to a comparison result of the current control sampling and the reference control sampling,
    wherein the reference control sampling is a maximum control reference for the determined rotation speed, and
    wherein the adjusting the switching frequency of the inverter includes, when the current control sampling is less than or equal to the maximum control sampling, determining a switching frequency corresponding to the maximum control sampling and changing the switching frequency to the determined switching frequency.

9. The method of claim 8, wherein, when the rotation speed of the motor is within a preset range in speed, the switching frequency is adjusted based on the rotation speed, and
    wherein the preset range in speed is a range that requires an increase in the control sampling.

10. The method of claim 9, wherein the switching frequency is increased stepwise within the preset range in speed such that the switching frequency is adjusted by a prescribed amount each time the rotation speed changes by a prescribed amount.

* * * * *